United States Patent [19]

Bartha et al.

[11] Patent Number: 5,112,495
[45] Date of Patent: May 12, 1992

[54] METHOD OF CLEANING UP PETROLEUM OIL SPILLS

[76] Inventors: John Bartha, 6805 Louise Ave., Van Nuys, Calif. 91406; Gyorgy Csapo, 33, Boszormenyi U., Hungary

[21] Appl. No.: 588,791

[22] Filed: Sep. 27, 1990

[51] Int. Cl.$^5$ ............................................. E02B 15/04
[52] U.S. Cl. .................................. 210/691; 210/773; 210/774; 210/922; 210/924; 210/805
[58] Field of Search ............. 210/671, 691, 922, 924, 210/925, 747, 773, 774, 800, 805, 513, 693

[56] References Cited

U.S. PATENT DOCUMENTS

| | | | |
|---|---|---|---|
| 164,907 | 6/1875 | Cresson | 210/774 |
| 2,881,127 | 4/1959 | Hetzel | 210/671 |
| 3,343,678 | 9/1967 | Olson | 210/773 |
| 3,518,183 | 6/1970 | Evans | 210/693 |
| 3,598,873 | 8/1971 | Bloch | 210/774 |
| 3,607,741 | 9/1971 | Sohnius | 210/691 |
| 3,657,125 | 4/1972 | Strickman | 210/693 |
| 3,674,683 | 7/1972 | Rainer | 210/693 |
| 3,723,307 | 3/1973 | Hunter | 210/671 |
| 3,785,972 | 1/1974 | Alquist et al. | 210/924 |
| 3,888,766 | 6/1975 | DeYoung | 210/680 |
| 4,385,990 | 5/1983 | Cale | 210/513 |

Primary Examiner—Stanley S. Silverman
Assistant Examiner—Neil M. McCarthy
Attorney, Agent, or Firm—John J. Posta, Jr.

[57] ABSTRACT

The improved method employs hydrocarbon wax, preferably paraffin wax, as the cleaning agent for petroleum oil spill slicks. The method includes spraying the molten wax on the petroleum oil-covered surface of, for example, an ocean or a coastline, allowing the wax to solidify on such surface, thereby entraining large volumes of hydrocarbon oil, then removing the solidified wax with entrained petroleum oil from the surface. The method is repeated as often as is needed in order to fully strip the surface of the petroleum oil. The wax is recovered by heating the mixture of the solidified wax with the entrained petroleum oil therein until the wax melts, after which it is decanted from the petroleum oil and is ready for reuse in the method. Preferably, the molten wax is paraffin heated to about 75°–100° C. in order to fully fluidize it so that it can be sprayed easily onto the oil-fouled surface. The wax is inert, that is, non-reactive chemically and biologically and when solidified does not stick to wild foul, fish, sea mammals, etc. Since the wax is reusable, the method is inexpensive while being efficient and fully effective.

12 Claims, No Drawings

METHOD OF CLEANING UP PETROLEUM OIL SPILLS

BACKGROUND OF THE INVENTION

1. Field of the Invention

The present invention generally relates to cleaning methods and more particularly to an improved method of cleaning up petroleum oil spills.

2. Prior Art & Discussion

The Exxon Valdez wreck that caused the worst U.S. oil spill in history occurred in Mar., 1989, disgorging 11 million gallons of petroleum oil along the Alaskan coast, resulting in great destruction of wildlife, severe damage to the Alaskan fishing industry and fouling of vast stretches of coastal beaches. Cleanup efforts associated with that oil spill are still going on. However, although larger than other such accidents, the Exxon Valdez oil spill is one of many which occur each week throughout each year.

Thus far, no easy and efficient method has been found to clean up the inland and coastal waters and beaches affected by such oil spills. Very small oil spills can be coralled through the deployment of inflatable floating hoses and booms, but these are of little use against large spills or even small spills unless prompt action is taken. Recently, the use of petroleum oil-digesting bacteria has been suggested. However, it is not known what the long-term effect of large quantitites of such bacteria will be on the environment, including the wildlife food chain. Most of what is being done for clean-up work merely consists of manually or machine peeling of partiallly solidified petroleum goo from beaches and allowing the petroleum oil still in the water to dissipate over time in the open sea. As the oil solidifies in water into gasey droplets, it sinks in the water, entrapping and killing sea creatures, fouling the sea bottoms, impeding fishing operations and fouling ship hulls and equipment.

There remains an urgent and great need for a simple, efficient, rapid and inexpensive method of stripping petroleum oil from waters and beaches so as to effectively clean up spills without harming wildlife or the environment. This need comes at an especially critical time when increased U.S. oil production is required to partially replace reduced supplies of mid-eastern oil. This includes offshore drillings near sensitive coastal areas that are patrolled by environmentalists. A proven method would assure clean-up from spills or exploratory mishaps, provided this standard method of equipment is at hand for such emergencies.

SUMMARY OF THE INVENTION

The improved method of the present invention satisfies all the foregoing needs. The method is substantially as set forth in the Abstract of the Disclosure. The purpose of the method is to remove petroleum oil originating from an spill from a surface such as water or a beach in a safe, rapid, inexpensive manner utilizing an inert agent perfectly harmless to the environment.

This purpose is accomplished through the use of present method which employs molten hydrocarbon wax, preferably paraffin, which entrains large amounts of petroleum oil and partially solidified goo and which, when solidified in place on a surface, allows the resultant mixture to be easily removed by skimming from that surface for transport to melting pots where the paraffin can be remelted and decanted from the oil for reuse in the present method. The paraffin is capable of entraining as much as 150 percent of its own volume of petroleum oil and goo and thus is efficient in placing the oil in a condition which allows it to skimmed easily and safely from the surface and transported away. In addition, the reclaimed oil (less volatile parts) remain in its original chemical constituents which can be processed in refineries rather than just labeling it as toxic waste.

The method principally includes spraying the molten hydrocarbon wax, preferably at a high enough temperature to be fully fluidized, directly on the petroleum oil-filled surface to be cleaned, allowing the wax to solidify and then removing the resultant solidified mixture from the surface to clean it. The method additionally includes remelting the wax in order to separate it from the entrained oil and recovering the wax for reuse in the present method and the oil for normal usage in such fuel applications as heating the wax.

The molten wax can be sprayed from extended length spray booms carried in ships, floats, drilling platforms, and the like. The paraffin attracts the petroleum oil to it and holds it in an entrained entrapped state as the wax solidifies so that both solidified wax and the petroleum oil can be easily lifted from the surface of an ocean, a bay or an inlet or the like water surface, or from a beach by mechanical skimmers or scrapers. Transport of the solidified wax oil mixture is easy and non-messy and safe, as are the separation and recovery of the wax from the oil. The method is economical and the wax is safe for wildlife and the environment. Further features of the present method are set forth in the following detailed description.

DETAILED DESCRIPTION

In accordance with the first step of the present method, hydrocarbon wax in molten form is sprayed onto a petroleum oil spill-contaminated surface of water, beach or the like. The hydrocarbon wax used in the present method can be light, waxy, odorless, chemically and biologically inert to wildlife and the environment, and solid at ambient temperature, e.g., 70°–75° F. It is derived from petroleum fractions, animal fats, bees wax, etc., and is a mixture of solid hydrocarbons chiefly of the methane series.

The hydrocarbon wax of choice in the present method is paraffin, which is the least expensive and most readily available hydrocarbon wax and which performs most satisfactorily in the present method. Paraffin wax varies in melting point from about 47° C. to about 65° C., but usually is about 50°–55° C. in melting point. Although it is soluble in benzene, carbon disulfide, olive oil, turpentine and warm alcohol, it is insoluble in water. After melting at about 47°–65° C., it becomes less viscous at about 75°–100° C., and is most fluidized at that temperature and easiest to finely spray through extended spray booms.

Other hydrocarbon waxes, such as microcrystalline wax, can be used in place of the paraffin but are more expensive. Microcrystalline wax has a melting point of 190°–195° F., requiring more energy than paraffin to fluidize it. However, it can be used satisfactorily in the present method.

Preferably, the spraying of the molten paraffin wax takes place at about 75°–100° C. The paraffin binds and traps up to 50 percent more volume of petroleum oil than its own volume and thus is a very efficient petroleum oil scavenger. Other hydrocarbon waxes are less efficient in this respect.

The next step of the present method is to allow the sprayed wax to solidify on the sprayed surface. It floats in water and is quickly chilled thereby to a solid form. The same is true of sand and beach rocks coated with petroleum oil. The molten wax is quickly coated thereby, after spraying thereon, and quickly sets to solid form. The resultant mixture of solidified wax and petroleum oil entrained therein is usually about 40 percent by volume paraffin wax and about 60 percent by volume petroleum oil, dirt, etc.

Further, in accordance with the present method, the solidified wax-petroleum oil mixture is mechanically skimmed or scraped from the sprayed surface to expose a clean oil-free surface. The skimmed solidified mixture can be transported, in accordance with the present method, to a remelter pot, where it can be heated to above the melting point of the wax. The wax is thereafter recovered by decanting it from the petroleum oil and can then be reused in molten form in the present method. The recovered petroleum oil can be used as fuel for the wax melting step.

Thus, the method is very economical, rapid and efficient. In the method, solidified wax holds the petroleum oil out of contact with the substrate, so that wildlife which subsequently contacts the solidified wax-petroleum oil mixture will not be fouled with. The solidified wax is slick and does not stick to fur or feathers. It is non-poisonous; that is, it is chemically and biologically inert. Thus, it is safe for human and wildlife contact. It protects the environment. Further details of the present invention are set forth in the following specific Example.

EXAMPLE

Petroleum oil is poured over a one acre area of ocean water in a test until the resulting oil slick is about one-third inch in thickness. The ocean water is about 50° F. Paraffin wax with a melting point of about 50° C. is heated to a fluidized molten mass having a temperature of about 80° C. and is then maintained at that temperature and sprayed on the aforesaid oil slick-contaminated acre area through spray booms to a thickness of about one-fourth inch. Boats carrying the spray booms begin in one end of the slick and work their way across the slick. The molten wax solidifes within 15-20 seconds after striking the slick surface, thereby mixing with & containing the petroleum oil. Wave action and operation of boats through the slick assure adequate mixing of the wax and oil. The resultant mixture is later gathered up with boat-operated mechanical skimmers, freeing the acre area entirely of the oil slick. The solidified wax-petroleum oil mixture with the petroleum oil completely entrapped and entrained in the wax is then pushed to a gathering point, shoveled into melting pots and reheated to 80° C., whereupon the molten wax and oil separate and the wax is decanted from the oil and is ready for reuse in the method. The entire process is easily automated, requiring fewer personnel.

In a first parallel test, the temperature of the molten paraffin is raised to 90° C. before spraying it on the water, and the molten paraffin is increased in thickness to about one-third inch. Results are comparable to the original test, showing the increased volume and temperature of paraffin are not needed.

In a second parallel test, microcrystalline wax is substantial for the paraffin wax and the temperature of the molten wax is raised to 100° C. before spraying. The microcrystalline wax is somewhat less efficient than paraffin at entrapping petroleum oil, but is still fully successful in the method when used in a thickness of at least about ⅓-½ inch over the oil slick; that is, in a volume at least as great as that of the petroleum oil. Further tests confirm the above results.

Accordingly, the tests of the above specific Example show that hydrocarbon wax, particularly paraffin wax, is fully effective in entrapping and entraining large volumes of petroleum oil in an oil slick on water. Comparable results are obtained with oil-coated beach sand and rocks. The thus entrained petroleum oil is held by the wax so that it can be skimmed, stripped, scraped and otherwise gathered, after which the wax can be remelted to separate it from the oil and both the wax and oil can be recovered. Further features of the invention are as set forth in the foregoing.

Various modifications, changes, alterations and additions can be made in the improved method of the present invention, its components and parameters. All such modifications, changes, alterations and additions as are within the scope of the appended claims form part of the present invention.

What is claimed is:

1. A method of cleaning up petroleum oil spills, said method comprising:
    a) spraying a surface covered with a petroleum oil spill slick with molten hydrocarbon wax, said was floating on said surface;
    b) solidifying said wax on said surface;
    c) removing the solidified wax with entrained petroleum oil trapped thereon from said surface to clean said surface; and,
    d) heating said solidified wax with entrained petroleum oil above the melting point of said wax and decanting molten wax from said petroleum oil for reuse in said method.

2. The improved method of claim 1 wherein said hydrocarbon wax is paraffin.

3. The improved method of claim 1 wherein said surface is one of water and a coastline.

4. The improved method of claim 1 wherein a sufficient volume of molten wax is sprayed on said slick to fully entrain said petroleum oil.

5. The improved method of claim 1 wherein said steps of spraying, solidifying, remelting and reusing said wax are repeated until all of said petroleum oil is removed from said surface.

6. The improved method of claim 1 wherein said wax is paraffin and is heated to about 75°-100° C. before said spraying to render said paraffin sufficiently fluidized for easy spraying, and wherein said sprayed paraffin wax is solidified at below about 45° C.

7. A recycling method of recovering oil in petroleum oil spills on water, comprising:
    a) heating hydrocarbon wax to a molten state,
    b) spraying the heated wax onto the oil in the water so that the oil clings to the wax,
    c) allowing the wax to solidify with the oil attached thereto,
    d) removing the solidified wax from the water,
    e) heating the solidified wax removed above the melting point of the wax,
    f) decanting the molten wax from the oil; and,
    g) repeating the steps of paragraphs a to f with the recovered wax.

8. The method of claim 7 wherein said hydrocarbon wax is paraffin.

9. The method of claim 7 wherein said surface is one of water and a coastline.

10. The method of claim 7 wherein a sufficient volume of molten wax is sprayed on said slick to fully entrain said petroleum oil.

11. The method of claim 7 wherein said steps of spraying, solidifying, remelting and reusing said wax are repeated until all of said petroleum oil is removed from said surface.

12. The method of claim 7 wherein said wax is paraffin and is heated to about 75°–100° C. before said spraying to render said paraffin sufficiently fluidized for easy spraying, and wherein said sprayed paraffin wax is solidified at below about 45° C.

* * * * *